US012688627B2

(12) United States Patent
Cheng et al.

(10) Patent No.: US 12,688,627 B2
(45) Date of Patent: Jul. 21, 2026

(54) USING AUGMENTED FACE IMAGES TO IMPROVE FACIAL RECOGNITION TASKS

(71) Applicant: LEMON Inc., Grand Cayman (KY)

(72) Inventors: Shuo Cheng, Los Angeles, CA (US);
Guoxian Song, Los Angeles, CA (US);
Wanchun Ma, Los Angeles, CA (US);
Chao Wang, Los Angeles, CA (US);
Linjie Luo, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 665 days.

(21) Appl. No.: 17/751,393

(22) Filed: May 23, 2022

(65) Prior Publication Data

US 2023/0377368 A1     Nov. 23, 2023

(51) Int. Cl.
*G06V 40/16* (2022.01)
*G06T 11/60* (2006.01)
*G06V 10/74* (2022.01)
*G06V 10/82* (2022.01)

(52) U.S. Cl.
CPC ............ *G06V 40/172* (2022.01); *G06T 11/60* (2013.01); *G06V 10/761* (2022.01); *G06V 10/82* (2022.01)

(58) Field of Classification Search
CPC .... G06V 40/172; G06V 10/761; G06V 10/82; G06T 11/60
See application file for complete search history.

(56) References Cited

U.S. PATENT DOCUMENTS

| 2022/0028139 A1* | 1/2022 | Mitra | G06V 40/175 |
| 2024/0005643 A1* | 1/2024 | Suzuki | G16H 20/40 |

OTHER PUBLICATIONS

Ž. Emeršič, N. O. Playà, V. Štruc and p. Peer, "Towards Accessories-Aware Ear Recognition," 2018 IEEE International Work Conference on Bioinspired Intelligence (IWOBI), San Carlos, Costa Rica, 2018, pp. 1-8, doi: 10.1109/IWOBI.2018.8464138. (Year: 2018).*
Natsume, R., Yatagawa, T., & Morishima, S. (2018). Rsgan: face swapping and editing using face and hair representation in latent spaces. arXiv preprint arXiv:1804.03447. (Year: 2018).*
Li Z, Min MR, Li K, Xu C. StyleT2I: Toward Compositional and High-Fidelity Text-to-Image Synthesis. arXiv preprint arXiv:2203.15799. Mar. 29, 2022. (Year: 2022).*
(Continued)

*Primary Examiner* — Stephen R Koziol
*Assistant Examiner* — Ashley Hytrek

(57) ABSTRACT
Methods and systems for generating synthetic images based on an input image are described. The method may include receiving an input image; generating, using an encoder, a first latent code vector representation based on the input image; receiving a latent code corresponding to a feature to be added to the input image; modifying the first latent code vector representation based on the latent code corresponding to the feature to be added; generating, by an image decoder, a synthesized image based on the modified first latent code vector representation; identifying, using a landmark detector, one or more landmarks in the base image; identifying, using a landmark detector, one or more landmarks in the synthesized image; determining a measure of similarity between the landmark identified on the base image and the landmark identified in the synthesized image; and discarding the synthesized image based on the comparison.

18 Claims, 9 Drawing Sheets

(56) References Cited

OTHER PUBLICATIONS

Sampath, V., Maurtua, I., Aguilar Martin, J.J. et al. A survey on generative adversarial networks for imbalance problems in computer vision tasks. J Big Data 8, 27 (2021). https://doi.org/10.1186/s40537-021-00414-0 (Year: 2021).*

Ramaswamy, V. V., Kim, S. S., & Russakovsky, O. (2021). Fair attribute classification through latent space de-biasing. In Proceedings of the IEEE/CVF conference on computer vision and pattern recognition (pp. 9301-9310). (Year: 2021).*

Li, Z., & Xu, C. (2021). Discover the unknown biased attribute of an image classifier. In Proceedings of the IEEE/CVF International Conference on Computer Vision (pp. 14970-14979). (Year: 2021).*

Xu Y. et al., High-resolution Face Swapping via Latent Semantics Disentanglement. https://arxiv.org/abs/2203.15958, Mar. 30, 2022, pp. 1-12 [Retrieved on Oct. 16, 2023] <DOI: 10.48550/ARXIV.2203.15958> (Year: 2022).*

International Search Report mailed Oct. 30, 2023 for PCT/SG2023/050334.

Xu Y. et al., High-resolution Face Swapping via Latent Semantics Disentanglement. https://arxiv.org/abs/2203.15958, Mar. 30, 2022, pp. 1-12 [Retrieved on Oct. 16, 2023] <DOI: 10.48550/ARXIV.2203.15958>.

Nickabadi A. et al., A comprehensive survey on semantic facial attribute editing using generative adversarial networks. https://arxiv.org/abs/2205.10587, May 21, 2022, pp. 1-45 [Retrieved on Oct. 16, 2023] <DOI: 10.48550/ARXIV.2205.10587>.

* cited by examiner

INPUT

OUTPUT

INPUT

OUTPUT

900

USING AUGMENTED FACE IMAGES TO IMPROVE FACIAL RECOGNITION TASKS

BACKGROUND

The number of samples that is required for training a machine learning model tends to be proportional to the network capacity, the number of output dimensions, and the complexity of the task. For tasks that require operating in an arbitrary, in-the-wild environment, the amount of data involved may be staggeringly large. For example, the amount of effort required to naively capture and label a sufficient dataset to cover all possible conditions for face-related recognition tasks to predict ages, races, hair styles, facial hairs, accessories (e.g., eyewear, earrings), illuminations, etc., may simply grow exponentially.

As the visual effects and video game industries drive the realism of computer generated imagery (CGI), trends of using legacy CGI techniques to generate synthetic dataset for ML model training emerge. Some of the benefits of having a synthetic dataset generation system include nearly perfect labels that can be obtained for free since they are merely the control variables or derived properties for the aforementioned parametric model, a virtually unlimited number of samples, as a dataset generation system can generate data for as long as is needed. Nevertheless, to create such a generation system, which may include a controllable face and body generators having a comprehensive library of 3D assets for components that include hair and accessories for example, can still be daunting work.

Accordingly, there is a need to identify and utilize low cost yet effective ways to obtain data samples for robust model training. It is with respect to these and other general considerations that embodiments have been described. Although relatively specific problems have been discussed, the examples described herein should not be limited to solving the specific problems identified in the background above.

SUMMARY

In accordance with examples of the present disclosure, a low cost yet effective way to augment existing data samples for robust model training is described. In examples, a framework that incorporates StyleGAN manipulation to generate augmented images for machine-learning training enhances the inference quality of facial recognition tasks, especially for the underrepresented samples encountered during in the wild testing.

Thus, in accordance with examples of the present disclosure, a method for generating synthetic images based on an input image. The method may include receiving an input image and generating, using an encoder, a first latent code vector representation based on the input image. The method may further include receiving a latent code corresponding to a feature to be added to the input image and modifying the first latent code vector representation based on the latent code corresponding to the feature to be added. Further, the method may include generating, by an image decoder, a synthesized image based on the modified first latent code vector representation. In examples, the method may include identifying, using a landmark detector, one or more landmarks in the base image, identifying, using a landmark detector, one or more landmarks in the synthesized image, determining a measure of similarity between the landmark identified on the base image and the landmark identified in the synthesized image, and discarding the synthesized image based on the comparison.

In accordance with examples of the present disclosure, a system for generating synthetic images based on an input image is described. The system may include one or more hardware processors configured by machine-readable instructions to: receive an input image; generate, using an encoder, a first latent code vector representation based on the input image; receive a latent code corresponding to a feature to be added to the input image; modify the first latent code vector representation based on the latent code corresponding to the feature to be added; generate, by an image decoder, a synthesized image based on the modified first latent code vector representation; identify, using a landmark detector, one or more landmarks in the base image; identify, using a landmark detector, one or more landmarks in the synthesized image; determine a measure of similarity between the landmark identified on the base image and the landmark identified in the synthesized image; and discard the synthesized image based on the comparison.

In accordance with examples of the present disclosure, a non-transient computer-readable storage medium comprising instructions for generating synthetic images based on an input image is described. In examples, the instructions are executable by one or more processors to cause the one or more processors to: receive an input image; generate, using an encoder, a first latent code vector representation based on the input image; receive a latent code corresponding to a feature to be added to the input image; modify the first latent code vector representation based on the latent code corresponding to the feature to be added; generate, by an image decoder, a synthesized image based on the modified first latent code vector representation; identify, using a landmark detector, one or more landmarks in the base image; identify, using a landmark detector, one or more landmarks in the synthesized image; determine a measure of similarity between the landmark identified on the base image and the landmark identified in the synthesized image; and discard the synthesized image based on the comparison.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
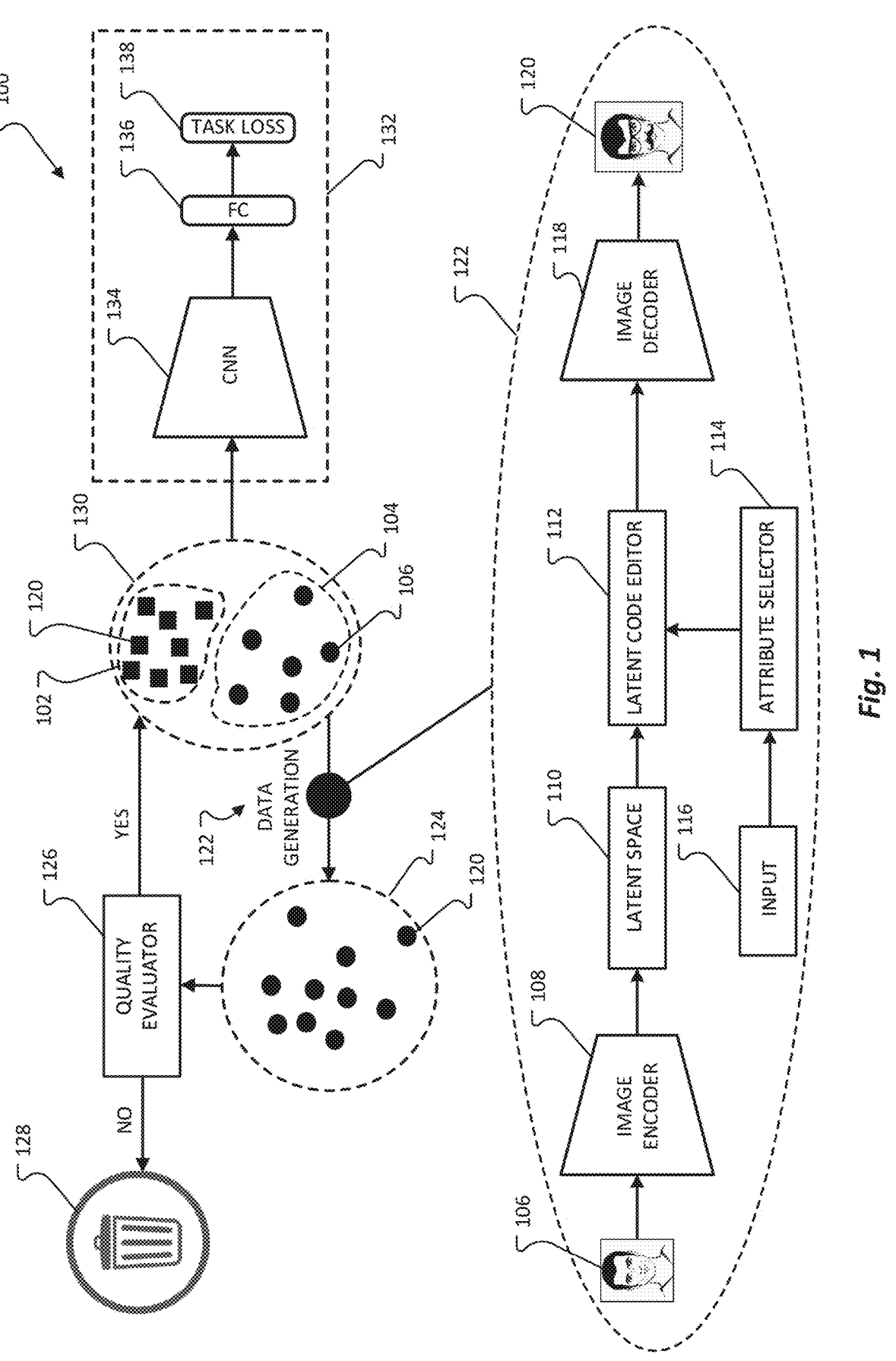
FIG. 1 depicts an image augmentation and generation framework in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The process of training a machine learning (ML) model is primarily about tuning its parameters such that it can map any input to a specific output. The number of samples that is required for training a model is usually proportional to the network capacity, the number of output dimensions, and most of all, the complexity of the task. For tasks that are required to operate in an arbitrary, in-the-wild environment, the amount of the data could be staggeringly large. For example, the effort to naively capture and label a sufficient dataset to cover all possible conditions for a face-related recognition task that predicts ages, races, hair styles, facial hairs, accessories (eyewear, earrings), illuminations, etc., could simply grow exponentially.

As the visual effects and video game industries drive the realism of computer generated imagery (CGI), trends of using legacy CGI techniques to generate synthetic dataset for ML model training emerge. Some of the benefits of having a synthetic dataset generation system include nearly perfect labels that can be obtained for free since they are merely the control variables or derived properties for the aforementioned parametric model, a virtually unlimited number of samples, as a dataset generation system can generate data for as long as is needed. Nevertheless, to create such a generation system, which may include a controllable face and body generators having a comprehensive library of 3D assets for components that include hair and accessories for example, can still be daunting work.

Thus, a system that lies between a real-captured approach and a pure-synthesized approach is a so-called augmentation approach. In typical augmentation operations for image data, geometric or color augmentations, random erasing, and feature space augmentation operations maybe performed. More recently, StyleGAN and its variants are able to generate high quality and very natural looking synthetic facial images. These techniques can be adapted for use in image augmentation techniques as well, mostly in the area of image transfer and stylization. InterFaceGAN also provides a way to identify semantic latent vectors in StyleGAN for further manipulation and use. As previously described, a framework for manipulating images to generate augmented image data for machine learning is presented. Accordingly, such framework is capable of enhancing the inference quality of facial recognition tasks. As an example, a task that predicts facial blendshape activation from a facial image is utilized as a task that is trained using such augmented images.

A task that predicts facial blendshape activation (e.g. jawOpen, eyeB link, etc.) from a facial image is commonly used in facial animation applications. A blendshape model is a linear deformable model based on a set of pre-defined shapes which represent the surface movement of various facial regions, and the "activation" is represented as the blending weights of the linear model. To train a neural network to perform such task, a paired dataset is prepared, where each sample consists of a facial image and its corresponding blendshape activation; thus the neural network can be trained in a supervised manner. In order to diversify the training samples, features like eyewear or beards may be added to the real-captured, or original, image. However, such additional features generally may not alter the facial expression in the image since it is tied to the paired activation. As described herein, there are two major stages involved in the augmented image generation framework described herein. First, the input image, or original image, may be encoded to latent space, such that the latent codes may be edited and use a pre-trained model, such as but not limited to StyleGAN2, to generate a final augmented output image from the modified latent code. Second, after performing the data augmentation generation described in the first step, a landmark detector may be used to extract facial landmarks from the original input image and the augmented output image; such facial landmarks may be compared to identify, or filter, the good, augmented images from the bad augmented images. Finally, the augmented images may be used in the training of the neural network to boost its performance as illustrated below.

For data augmentation, the augmented image generation framework may utilize InterFaceGAN to identify those semantic latent vectors that exist in StyleGAN. For example, a pre-trained StyleGAN encoder may be used to map the images into latent space having some attributes labels. Accordingly, an independent linear support vector machine (SVM) may be applied to each attribute. A hyperplane of each SVM and its corresponding normal vector can be associated with such semantic meaning. To augment one or more images in the dataset, each image is encoded into one or more latent codes and then a randomly-scaled semantic vector may be added to the latent code, where the randomly-scaled semantic vector may be added to promote the diversity of augmentation. Such augmented codes (e.g., resulting semantic vector) may then be forwarded to a pre-trained StyleGAN2 where the final augmented output image may be synthesized.

In an example task, the goal of the augmented image generation framework is to create training images that can as much as possible re-use the original output (e.g., blendshape activation). However, if the augmented image contains undesired facial expression changes, which would violate the underlying blendshape activation, then this could jeopardize the inference quality. Specifically, for each input image $x' \in R^{H \times W \times 3}$, the generated image should be $x^ \in R^{H \times W \times 3}$ to maintain task-related attributes with the exception of the modified attributes (i.e., beard, glasses). To measure the validity of the generated samples, a face key-point detector may be used to extract facial landmarks: $\Phi: R^{H \times W \times 3} \rightarrow R^{240 \times 2}$. A normalized quality score may then be generated as the root-mean-square error between the landmarks from the original image and its generated augmented counterpart. The generated images that have quality score above a given threshold may then be used in a dataset to train a machine learning model, where the dataset includes images with the intended visual attributes. Accordingly, the trained model is more robust for those previously underrepresented attributes. In examples, a convolutional neural network may be used as a feature extractor and a small number of fully-connected layers may be used for regressing task-related values. The smooth L1 loss can be used, and the machine learning model including the neural network is trained with the Adam optimizer.

Accordingly, some of the generated images can be visualized with selected attributes, as depicted in the Figures, to demonstrate that the image augmentation framework can generate realistic images having the modified attributes but maintain a facial expression intact. As depicted in the Figures described herein, the proposed landmark disagreement metric serves (such as a correlation metric) may be used as a cue for filtering out low quality samples that are not suitable for use in training a machine learning model. Having a machine learning model learn using augmented data boosts the performance, especially when the low quality data is filtered, such as with some heuristic rules (i.e., landmark errors) to further improve the model performance.

FIG. 1 depicts an image augmentation framework 100 in accordance with examples of the present disclosure. The image augmentation framework. 100 may generate training images such as augmented data image 102, from an input image or original image, 106, where the input image or original image 106 is selected from a plurality of input images or original image is 104. Thus for example, the image augmentation framework 100 may utilize the data generation pipeline 122, where the input image or original image 106 is provided to an encoder, such as an image encoder 108 that is configured to map the input image 106 to latent space or latent vector codes.

The latent space 110 may include the latent vectors where latent space codes corresponding to the input image 106 as encoded by the image encoder 108. In examples, the latent code editor, 112, may receive a plurality of attribute selections, for example, from an attribute selector 114, and emphasize or otherwise augment the input image 106 or the latent vector code associated with the input image 106 to include the one or more desired attributes. In accordance with examples of the present disclosure, one or more inputs, 116, such as a selection of a feature corresponding to a beard, facial hair, accessories, earrings, glasses, etc. may be provided to the attribute selector 114. In examples, the attribute selector 114 may identify semantic, latent vectors corresponding to the inputs 116. Thus for example, the attribute selector 114 may correspond to the semantic vector identified from the attributes selector 114 and may be used to scale or otherwise adjust or modify the one or more latent codes from the original input image 106, thereby augmenting or emphasizing the desired feature or attribute provided as input 116 in the latent space. The resulting latent code can then be provided to an image decoder 118. For example, a StyleGAN decoder or a pre-trained StyleGAN decoder may be utilized, where the output image 120 may then be synthesized. In accordance with examples of the present disclosure, the synthesizing or otherwise generation of augmented images 104 from the from input images 102, may generate a plurality of augmented images 124.

For example, an augmented image 120 of the plurality of augmented images 124, may be provided to the quality evaluator 126, where the generated image 120 may be evaluated based on a quality metric, or other heuristic, evaluation process. For example, a facial landmark detector may be utilized to identify facial landmarks such that the facial landmarks associated with the augmented image 120 may be compared to the facial landmarks identified from the original input image 106, Where the quality of the generated augmented output image is low based on one or more evaluative features or heuristics, a correlation between the facial landmarks of the original input image 106 and the facial landmarks of the generated output image 120 as determined by one or more landmark detectors may not meet a specified threshold. Accordingly, the generated image may be discarded for example, by being, deleted or erased at 128. Accordingly, the good or otherwise positive samples, may include augmented generated output images corresponding to the set of images 130. The set of images 130 may then be provided to a machine learning model 132 for example, where the machine learning model 132 may be trained utilizing the generated augmented images.

A machine learning model may include 132 may be any other model that may utilize input images or otherwise be trained on input images as described herein. Thus, for example, the blend shape activation model 132 may include the convolutional neural network 134 with a fully connected layer 136, where such training may be evaluated based on some task loss associated with the blend shape activation 138.

Figure 2:
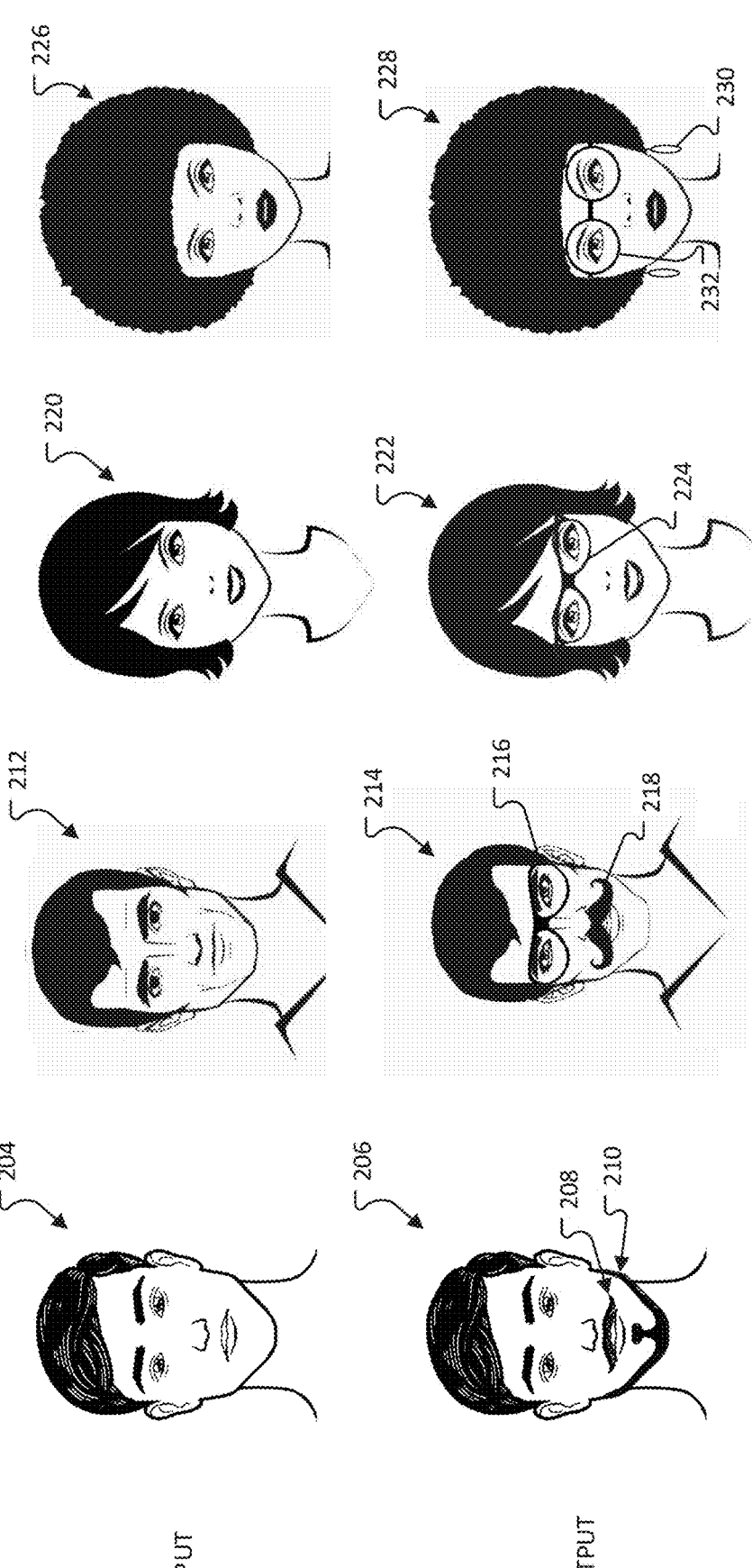
FIG. 2 depicts examples of input and output images in accordance with examples of the present disclosure.

FIG. 2 depicts examples of input and output images in accordance with examples of the present disclosure. A first input image 204 may correspond to the input image 106 of FIG. 1, and an output image 206 may correspond to the output image 120 of FIG. 1. The output image 206 includes a plurality of attributes or additional features such as a beard 210 and a mustache 208. As another example, a first input image 212 may correspond to the input image 106 of FIG. 1 and an output image 214 may correspond to the output image 120 of FIG. 1. The output image 214 includes a plurality of attributes or additional features such as a mustache 218 and glasses 216. As another example, a first input image 220 may correspond to the input image 106 of FIG. 1 and an output image 222 may correspond to the output image 120 of FIG. 1. The output image 222 includes a plurality of attributes or additional features such as glasses 224. As another example, a first input image 226 may correspond to the input image 106 of FIG. 1 and an output image 228 may correspond to the output image 120 of FIG. 1. The output image 228 includes a plurality of attributes or additional features such as glasses 232 and other accessories such as earrings 230.

Figure 3:
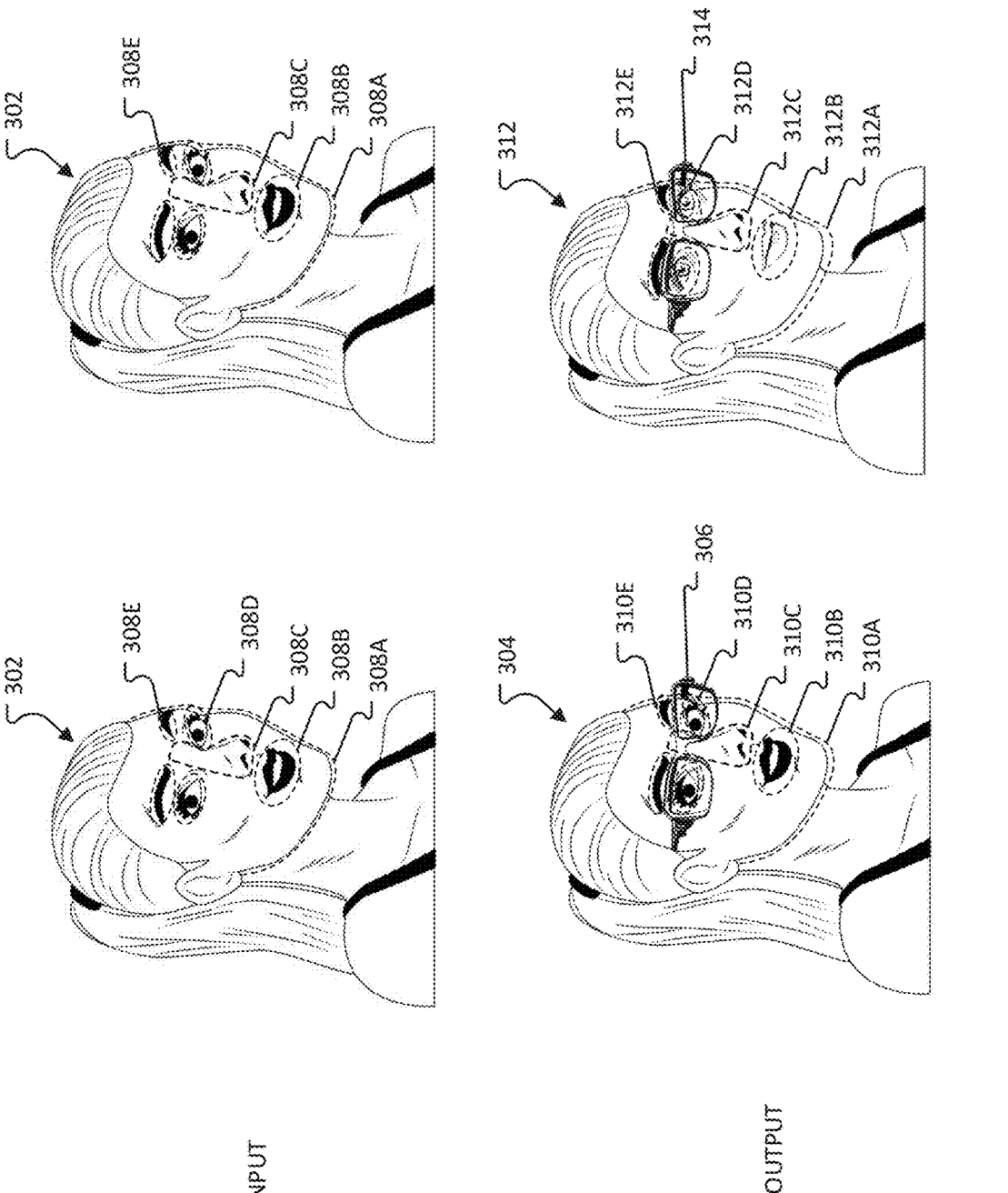
FIG. 3 depicts an example of directed to evaluating the input image and the output image based on one or more landmarks associated with a facial expression in accordance with examples of the present disclosure.

FIG. 3 depicts an example of directed to evaluating the input image and the output image based on one or more landmarks associated with a facial expression in accordance with examples of the present disclosure. That is, the one or more features of the input image 302 may be compared to one or more features of the output image 304 to determine how well such features correspond to one another. As depicted in FIG. 3, features 308A-308E may correspond well with features 310A-310E respectively, where the output image 304 has been augmented to include glasses 306. In examples, the features compared may be identified using a landmark detector. In some examples, the features may correspond to desired facial expressions, though such features may not be so limiting.

As depicted in FIG. 3, the output image 312 may include a mouth 312B that does not correlate well with the mouth 308B thereby varying the facial expression of the input image 302 too greatly. Accordingly, the output image 312 may be discarded.

Figure 4:
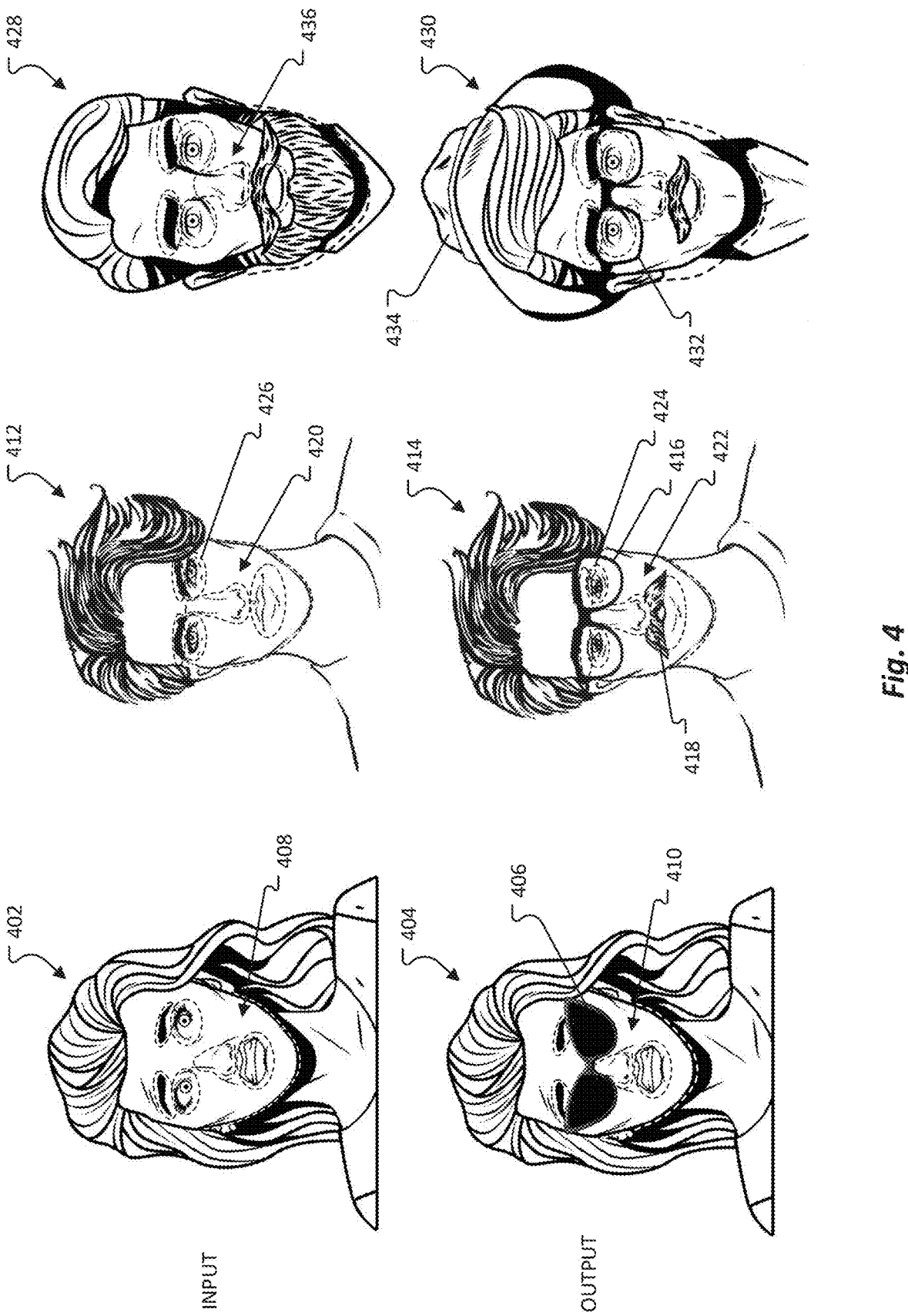
FIG. 4 depicts additional examples of output images including augmented data and being generated from respective input images.

FIG. 4 depicts additional examples of output images 404, 414, and 430 including augmented data and being generated from respective input images 402, 412, and 428. In examples, the facial feature 408 may be similar to the facial feature 410, where the output image includes glasses 406. However, in some examples, the eyes 424 corresponding to eyes 426 may be different, such that the output image 414 having the mustache 418 and glasses 416 is not close enough or otherwise does not have the same facial features as the input image, where such features may be included in the comparison sets of 422 and 420. The output image 430 generally illustrates that, in some examples, features may be removed from an input image. That is, an augmented output image 430 for example, may not have a feature that the input image 428 has. In such an example, the output image 430 does not have the beard 436, but does have glasses 432 and a hat 434 added.

Figure 5:
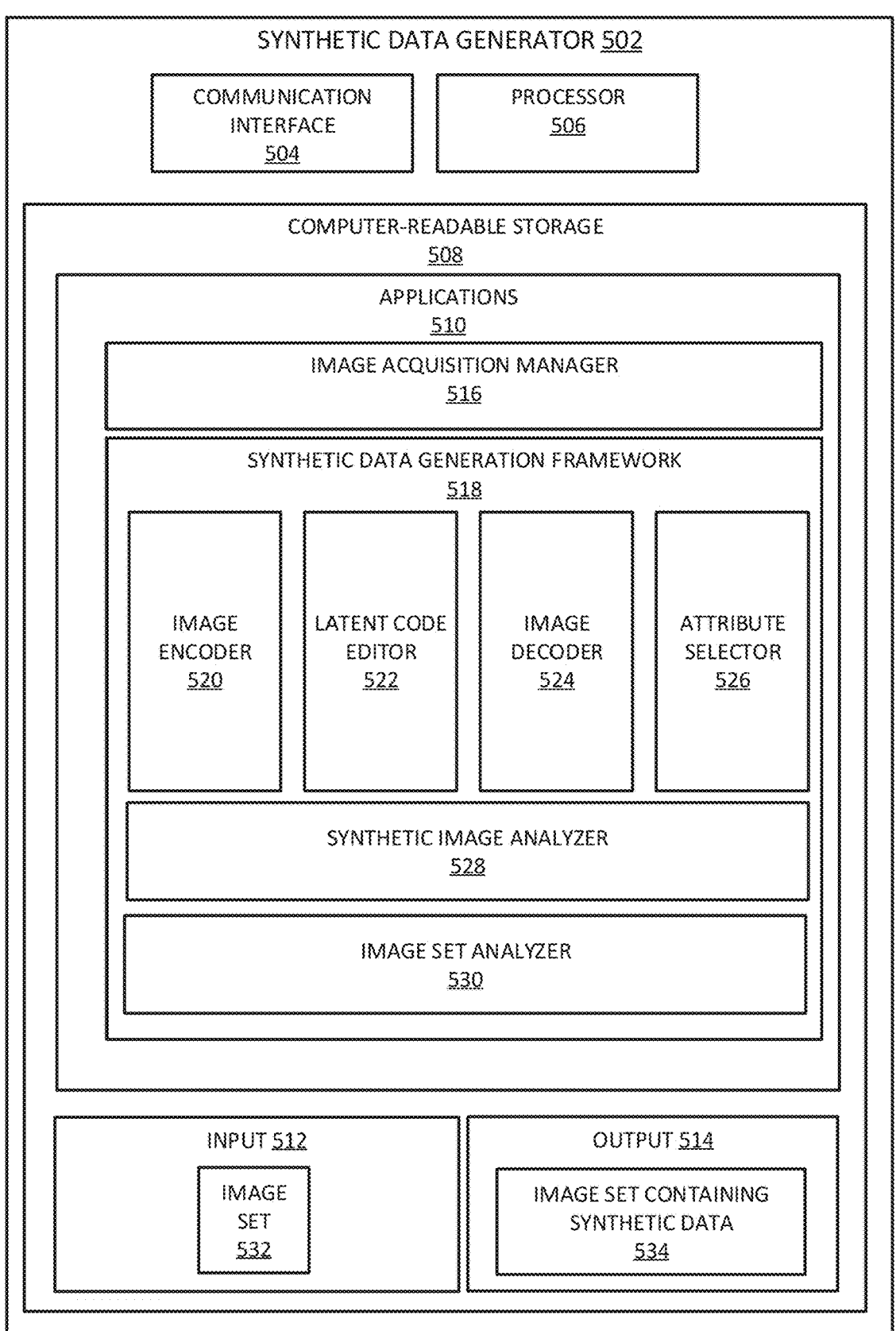
FIG. 5 depicts aspects of a synthetic data generator utilized to generate augmented images in accordance with examples of the present disclosure.

FIG. 5 depicts aspects of a synthetic data generator 502 utilized to generate augmented images in accordance with examples of the present disclosure. In examples, the synthetic data generator 502 may be a hardware device, such as a server. In examples, the synthetic data generator 502 may include a communication interface 504, a processor 506, and a computer-readable storage 508 including one or more application 510. In examples, the communication interface 504 may be coupled to a network and receive the plurality of input images, e.g., an image set 532, as input 512. An image acquisition manager 516 may manage the acquisition of the images 532, and in some instances, may perform preprocessing of the images to ready for augmentation. The image set 532 may include an input image 102 (FIG. 1) for example. In examples, the image encoder 520 may be the same as or similar to the image encoder 108 of FIG. 1. In examples, the latent code editor 522 may be the same as or similar to the latent code editor 112 of FIG. 1. In examples, the image decoder 524 may be the same as or similar to the image decoder 118 of FIG. 1. In examples, the attribute selector 526 may be the same as or similar to the attribute selector 114 of FIG. 1. In examples, the synthetic image analyzer 530 may be the same as or similar to the quality evaluator 126 of FIG. 1. In some examples, an image set analyzer 530 may be utilized to analyze an input image set and determine one or more features or attributes underrepresented by such input image set. Accordingly, the image set analyzer 530 may provide or otherwise select one or more attributes that are to be expressed or otherwise included in the augmentation process. Accordingly, the synthetic data generator 502 may generate an image set containing the synthetic data 534 and provide such set as output 514. In examples, the image set containing the synthetic data 534 may also include original input images from the image set 532.

Figure 6:
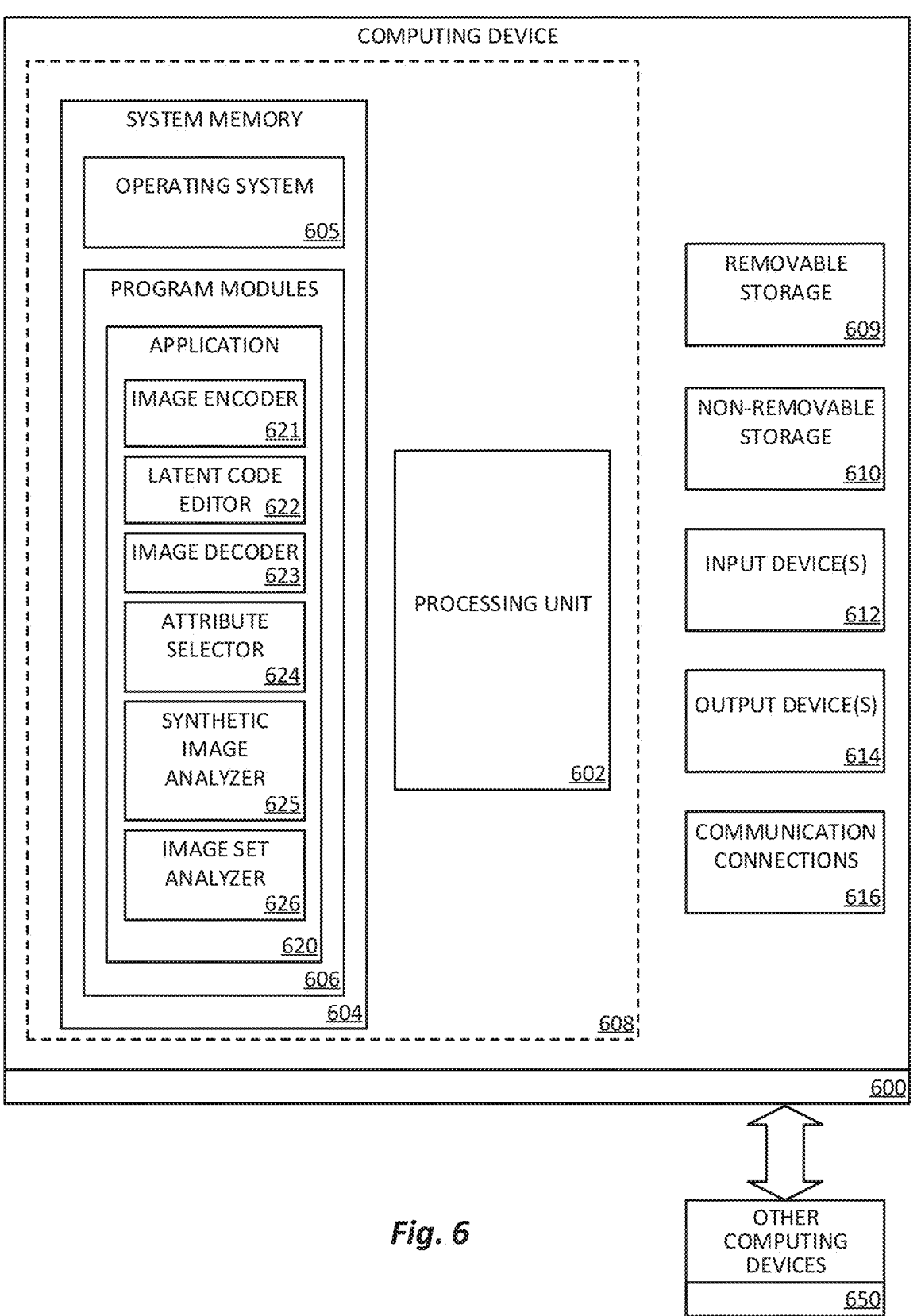
FIG. 6 depicts a block diagram illustrating physical components (e.g., hardware) of a computing system with which aspects of the disclosure may be practiced.

FIG. 6 is a block diagram illustrating physical components (e.g., hardware) of a computing system 600 with which aspects of the disclosure may be practiced. The computing device components described below may be suitable for the computing and/or processing devices described above. In a basic configuration, the computing system 600 may include at least one processing unit 602 and a system memory 604. Depending on the configuration and type of computing device, the system memory 604 may comprise, but is not limited to, volatile storage (e.g., random-access memory (RAM)), non-volatile storage (e.g., read-only memory (ROM)), flash memory, or any combination of such memories.

The system memory 604 may include an operating system 605 and one or more program modules 606 suitable for running software application 620, such as one or more components supported by the systems described herein. As examples, system memory 604 may include an image encoder 621, latent code editor 622, image decoder 623, synthetic image analyzer 625, image set analyzer 626, and attribute selector 624, where such components are supported by the systems described herein. The operating system 605, for example, may be suitable for controlling the operation of the computing system 600.

Furthermore, examples of the present disclosure may be practiced in conjunction with a graphics library, other operating systems, or any other application program and is not limited to any particular application or system. This basic configuration is illustrated in FIG. 6 by those components within a dashed line 608. The computing system 600 may have additional features or functionality. For example, the computing system 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., software applications 620) may perform processes including, but not limited to, the aspects, as described herein. Other program modules may be used in accordance with aspects of the present disclosure. Furthermore, examples of the disclosure may be practiced in an electrical circuit discrete electronic element, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing system 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 600 may also have one or more input device(s) 612 such as a keyboard, a mouse, a pen, a sound or voice input device, a touch or swipe input device, etc. The one or more input device 612 may include an image sensor. The output device(s) 614 such as a display, speakers, a printer, etc. may also be included. The aforementioned devices are examples and others may be used. The computing system 600 may include one or more communication connections 616 allowing communications with other computing devices/systems 650 as shown in FIG. 6. Examples of suitable communication connections 616 include, but are not limited to, radio frequency (RF) transmitter, receiver, and/or transceiver circuitry; universal serial bus (USB), parallel, and/or serial ports. The computing system 600 may represent one or more of the synthetic data generator 502.

The term computer readable media as used herein may include computer storage media. Computer storage media may include volatile and nonvolatile, removable, and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing system 600. Any such computer storage media may be part of the computing system 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7:
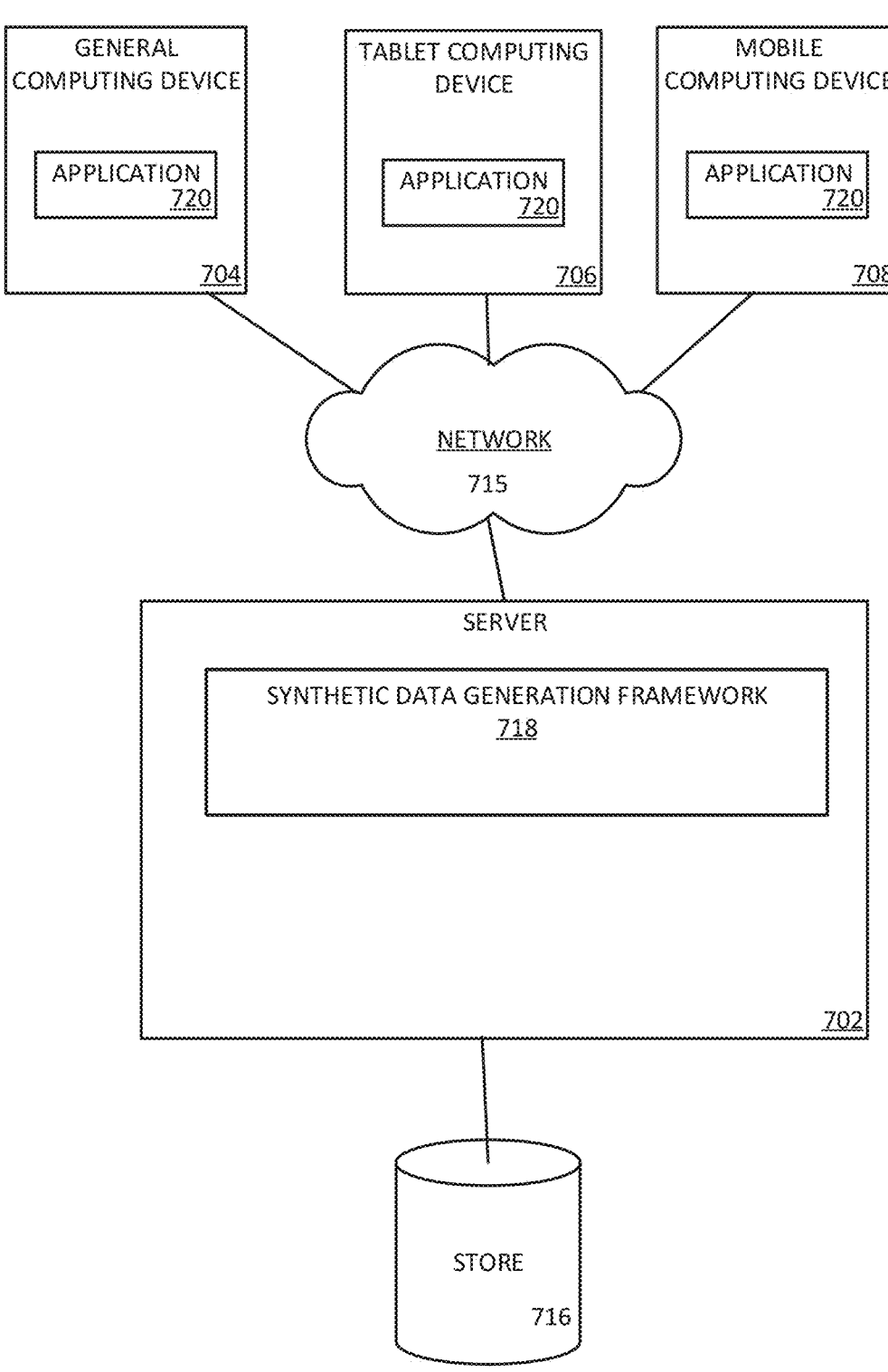
FIG. 7 illustrates one aspect of the architecture of a system for processing data received at a computing system from a remote source in accordance with examples of the present disclosure.

FIG. 7 illustrates one aspect of the architecture of a system for processing data received at a computing system from a remote source, such as a personal computer 704, tablet computing device 706, or mobile computing device 708. The personal computer 704, tablet computing device 706, or mobile computing device 708 may include one or more applications 720; such applications may include but are not limited to the image encoder 520, the latent code editor 522, the image decoder 524, the attribute selector 526, the synthetic image analyzer 528, the image set analyzer 530, and the applications 510. Content at a server device 702 may be stored in different communication channels or other storage types. For example, various documents may be stored using a directory service, a web portal, a stylized image service, an instant messaging store, or social networking services.

One or more of the previously described program modules 604 or software applications 606 may be employed by the server device 702 and/or the personal computer 704, tablet computing device 706, or mobile computing device 708, as described above. For example, the server device 702 may include the synthetic data generation framework 718 as previously described.

The server device 702 may provide data to and from a client computing device such as a personal computer 704, a tablet computing device 706 and/or a mobile computing device 708 (e.g., a smart phone) through a network 717. By way of example, the computer system described above may be embodied in a personal computer 704, a tablet computing device 706 and/or a mobile computing device 708 (e.g., a smart phone). Any of these examples of the computing devices may obtain content from the store 716, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
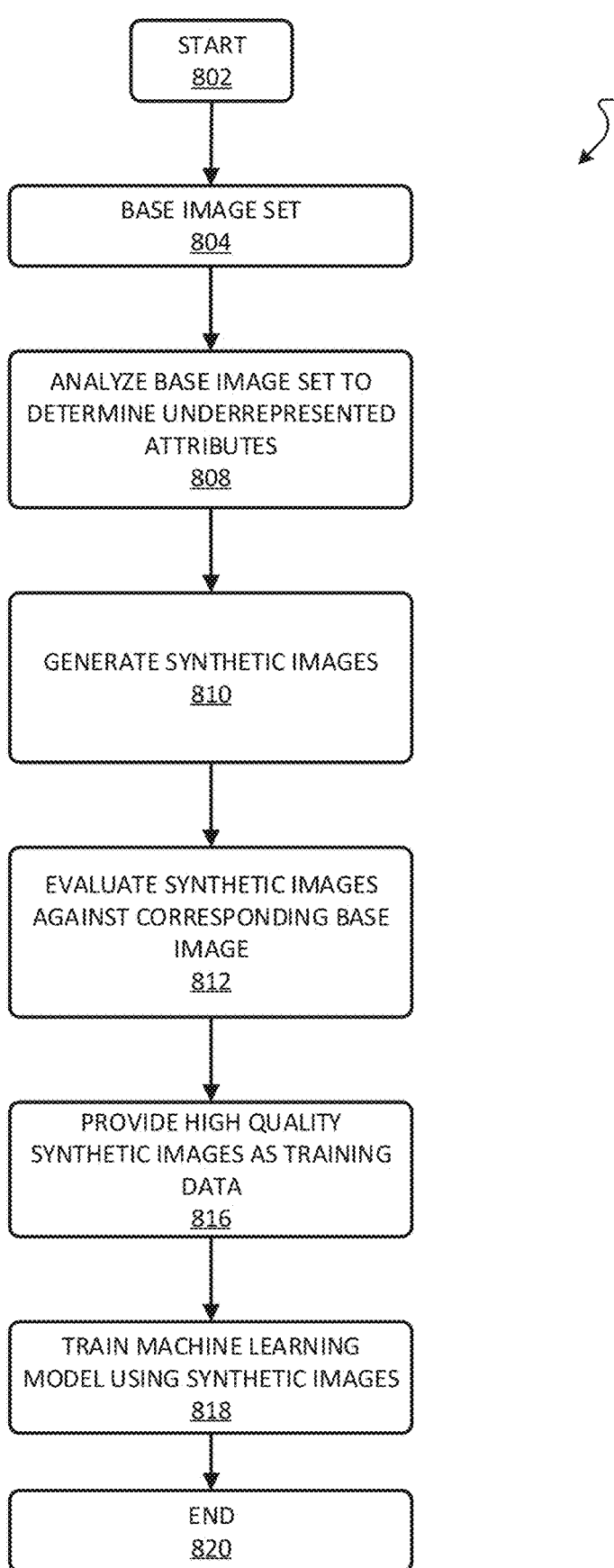
FIG. 8 depicts details of a first method in accordance with an example of the present disclosure.

FIG. 8 depicts an exemplary method 800 for generating augmented output data based on an original image in accordance with examples of the present disclosure. A general order for the steps of the method 800 is shown in FIG. 8. Generally, the method 800 starts at 802 and ends at 820. The method 800 may include more or fewer steps or may arrange the order of the steps differently than those shown in FIG. 8. The method 800 can be executed as a set of computer-executable instructions executed by a computer system and encoded or stored on a computer readable medium. In examples, aspects of the method 800 are performed by one or more processing devices, such as a computer or server. Further, the method 800 can be performed by gates or circuits associated with a processor, Application Specific Integrated Circuit (ASIC), a field programmable gate array (FPGA), a system on chip (SOC), a neural processing unit, or other hardware device. Hereinafter, the method 800 shall be explained with reference to the systems, components, modules, software, data structures, user interfaces, etc. described in conjunction with FIGS. 1-7.

The method 800 starts at 802, where flow may proceed to 804. At 804, a base image set including a plurality of input images may be received. At 808, the base image set may be analyzed to determine or otherwise identify attributes that are underrepresented in the base image set. For example, the attributes may be beards, earrings, hats, accessories, glasses, etc. At 810, each of the input images may be provided to data generation pipeline 122 as previously described, such that a plurality of augmented, or synthetic, output images may be generated. At 812, the generated synthetic images may be evaluated against the corresponding or respective base images, such that at 816, the high quality synthetic images are provided as training data. At 818, a machine learning model may be trained using the synthetic images. The method 800 may end at 820.

Figure 9:
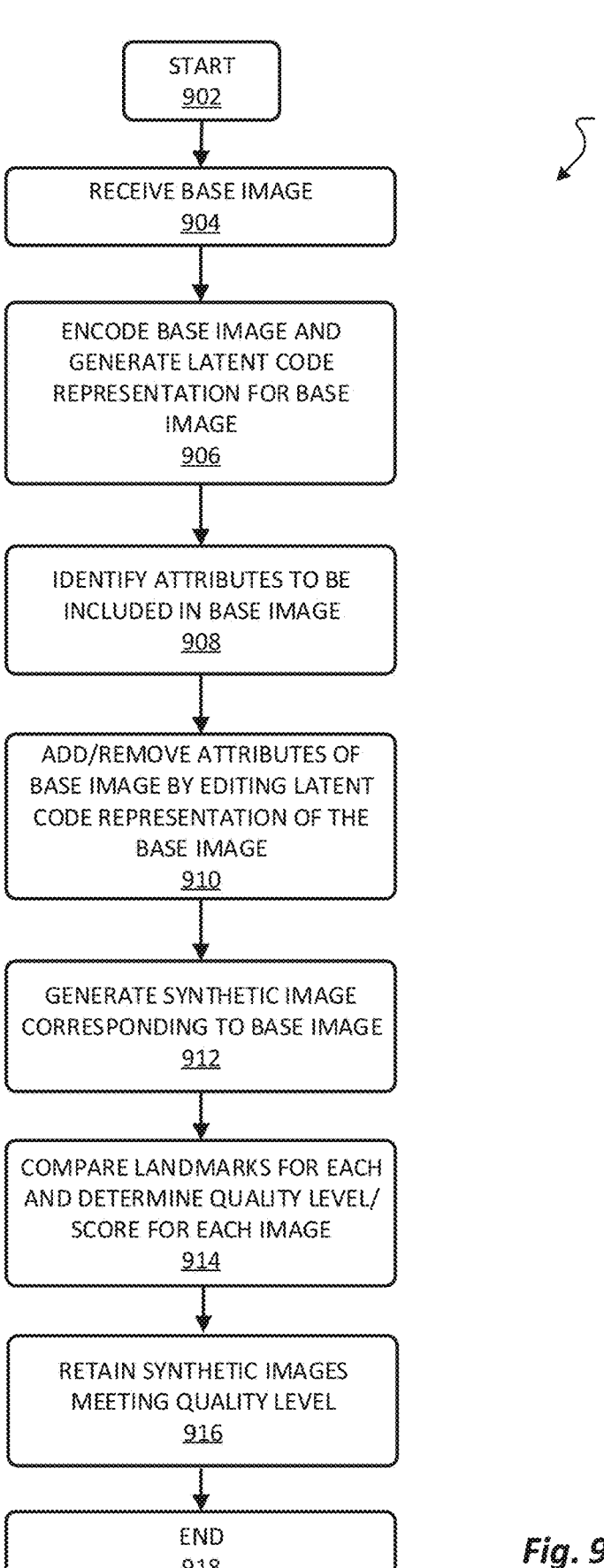
FIG. 9 depicts details of a second method in accordance with an example of the present disclosure.

FIG. 9 depicts an exemplary method 900 for generating augmented output data based on an original image in accordance with examples of the present disclosure. A general order for the steps of the method 900 is shown in FIG. 9. Generally, the method 900 starts at 902 and ends at 918. The method 900 may include more or fewer steps or may arrange the order of the steps differently than those shown in FIG. 9. The method 900 can be executed as a set of computer-executable instructions executed by a computer system and encoded or stored on a computer readable medium. In examples, aspects of the method 900 are performed by one or more processing devices, such as a computer or server.

Further, the method 800 can be performed by gates or circuits associated with a processor, Application Specific Integrated Circuit (ASIC), a field programmable gate array (FPGA), a system on chip (SOC), a neural processing unit, or other hardware device. Hereinafter, the method 900 shall be explained with reference to the systems, components, modules, software, data structures, user interfaces, etc. described in conjunction with FIGS. 1-8.

The method 900 starts at 902, where flow may proceed to 904. At 904, a base image is received. At 906, the base image may be encoded to generate a latent code representation of the base image. At 908, one or more attributes to be included or otherwise "generated" and included in the image are identified and at 910, the one or more attributes are added to or removed from the base image by editing the latent space code representation of the image. At 912, the modified latent space code may be provided to an image generator or decoder and the synthetic image may be generated. At 914, one or more landmarks of the base image may be identified and compared to one or more landmarks of the synthetically generated image. At 916, based on such comparison, a determination may be made to retain only those synthetically generated images having a correlation between one or more landmarks that meet a certain threshold. At 918, the method 900 may end.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The present disclosure relates to systems and methods for generating a texturized image according to at least the examples provided in the sections below:

(A) In accordance with at least one aspect of the present disclosure, a method for generating synthetic images based on an input image is described. The method may include receiving an input image; generating, using an encoder, a first latent code vector representation based on the input image; receiving a latent code corresponding to a feature to be added to the input image; modifying the first latent code vector representation based on the latent code corresponding to the feature to be added; generating, by an image decoder, a synthesized image based on the modified first latent code vector representation; identifying, using a landmark detector, one or more landmarks in the base image; identifying, using a landmark detector, one or more landmarks in the synthesized image; determining a measure of similarity between the landmark identified on the base image and the landmark identified in the synthesized image; and discarding the synthesized image based on the comparison.

(A2) In accordance with at least one aspect of A1 above, the latent code corresponding to the feature to be added is a randomly-scaled semantic vector.

(A3) In accordance with at least one aspect of A1-A2 above, the method includes analyzing a plurality of input images to determine a plurality of underrepresented features; and identifying the feature to be added to the input image based on the analysis.

(A4) In accordance with at least one aspect of A1-A3 above, the feature to be added corresponds to at least one of a beard, eyeglasses, earrings, or a mustache.

(A5) In accordance with at least one aspect of A1-A4 above, the image decoder is a StyleGAN image decoder.

(A6) In accordance with at least one aspect of A1-A5 above, the method includes training a machine learning neural network model utilizing a plurality of synthesized images, wherein the generated synthesized image is included in the plurality of synthesized images.

(A7) In accordance with at least one aspect of A1-A3 above, the input image includes a facial image of a person.

In yet another aspect, some examples include a system including one or more processors and memory coupled to the one or more processors, the memory storing one or more instructions which when executed by the one or more processors, causes the one or more processors perform any of the methods described herein (e.g., A1-A7 described above).

In yet another aspect, some examples include a non-transitory computer-readable storage medium storing one or more programs for execution by one or more processors of a storage device, the one or more programs including instructions for performing any of the methods described herein (e.g., A1-A7 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating synthetic images based on an input image, the method comprising:

receiving an input image;

generating, using an encoder, a first latent code vector representation based on the input image;

determining a feature underrepresented in a base image set by analyzing the base image set;

receiving a latent code corresponding to the feature to be added to the input image;

modifying the first latent code vector representation based on the latent code corresponding to the feature to be added to the input image;

generating, by an image decoder, a synthesized image based on the modified first latent code vector representation;

identifying, using a landmark detector, one or more landmarks in the input image;

identifying, using a landmark detector, one or more landmarks in the synthesized image;

determining a measure of similarity between the landmark identified on the input image and the landmark identified in the synthesized image; and discarding the synthesized image based on the measure of similarity, wherein the determining a feature underrepresented in a base image set further comprises:

analyzing a plurality of input images to determine at least one underrepresented feature of a plurality of underrepresented features; and identifying the feature to be added to the input image based on the analysis.

2. The method of claim 1, wherein the latent code corresponding to the feature to be added is a randomly-scaled semantic vector.

3. The method of claim 1, wherein the feature to be added corresponds to at least one of a beard, eyeglasses, earrings, or a mustache.

4. The method of claim 1, wherein the image decoder is a StyleGAN image decoder.

5. The method of claim 1, further comprising:

training a machine learning neural network model utilizing a plurality of synthesized images, wherein the generated synthesized image is included in the plurality of synthesized images.

6. The method of claim 1, wherein the input image includes a facial image of a person.

7. A system, comprising:

one or more hardware processors configured by machine-readable instructions to:

receive an input image;

generate, using an encoder, a first latent code vector representation based on the input image;

determine a feature underrepresented in a base image set by analyzing the base image set;

receive a latent code corresponding to the feature to be added to the input image;

modify the first latent code vector representation based on the latent code corresponding to the feature to be added to the input image;

generate, by an image decoder, a synthesized image based on the modified first latent code vector representation;

identify, using a landmark detector, one or more landmarks in the input image;

identify, using a landmark detector, one or more landmarks in the synthesized image;

determine a measure of similarity between the landmark identified on the input image and the landmark identified in the synthesized image; and discard the synthesized image based on the measure of similarity, wherein the determine a feature underrepresented in a base image set further comprises:

analyzing a plurality of input images to determine at least one underrepresented feature of a plurality of underrepresented features; and identifying the feature to be added to the input image based on the analysis.

8. The system of claim 7, wherein the latent code corresponding to the feature to be added is a randomly-scaled semantic vector.

9. The system of claim 7, wherein the feature to be added corresponds to at least one of a beard, eyeglasses, earrings, or a mustache.

10. The system of claim 7, further comprising: training a machine learning neural network model utilizing a plurality of synthesized images, wherein the generated synthesized image is included in the plurality of synthesized images.

11. The system of claim 7, wherein the input image includes a facial image of a person.

12. The system of claim 7, wherein the image decoder is a StyleGAN image decoder.

13. A non-transitory computer-readable storage medium comprising instructions being executable by one or more processors to cause the one or more processors to:

receive an input image;

generate, using an encoder, a first latent code vector representation based on the input image;

determine a feature underrepresented in a base image set by analyzing the base image set;

receive a latent code corresponding to the feature to be added to the input image;

modify the first latent code vector representation based on the latent code corresponding to the feature to be added to the input image;

generate, by an image decoder, a synthesized image based on the modified first latent code vector representation;

identify, using a landmark detector, one or more landmarks in the input image;

identify, using a landmark detector, one or more landmarks in the synthesized image;

determine a measure of similarity between the landmark identified on the input image and the landmark identified in the synthesized image; and discard the synthesized image based on the measure of similarity, wherein the determine a feature underrepresented in a base image set further comprises:

analyzing a plurality of input images to determine at least one underrepresented feature of a plurality of underrepresented features; and identifying the feature to be added to the input image based on the analysis.

14. The computer-readable storage medium of claim 13, wherein the latent code corresponding to the feature to be added is a randomly-scaled semantic vector.

15. The computer-readable storage medium of claim 13, wherein the determine a feature underrepresented in a base image set further comprises: training a machine learning neural network model utilizing a plurality of synthesized images, wherein the generated synthesized image is included in the plurality of synthesized images.

16. The computer-readable storage medium of claim 13, wherein the input image includes a facial image of a person.

17. The computer-readable storage medium of claim 13, wherein the image decoder is a StyleGAN image decoder.

18. The computer-readable storage medium of claim 13, wherein the feature to be added corresponds to at least one of a beard, eyeglasses, earrings, or a mustache.

* * * * *